S. P. JONES.
LUBRICATOR.
APPLICATION FILED APR. 29, 1921.
1,421,487.
Patented July 4, 1922.
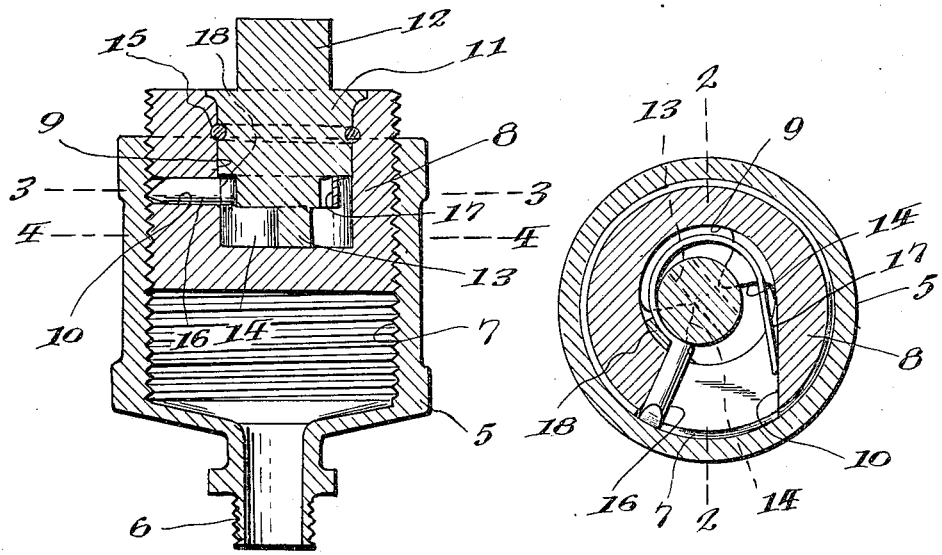
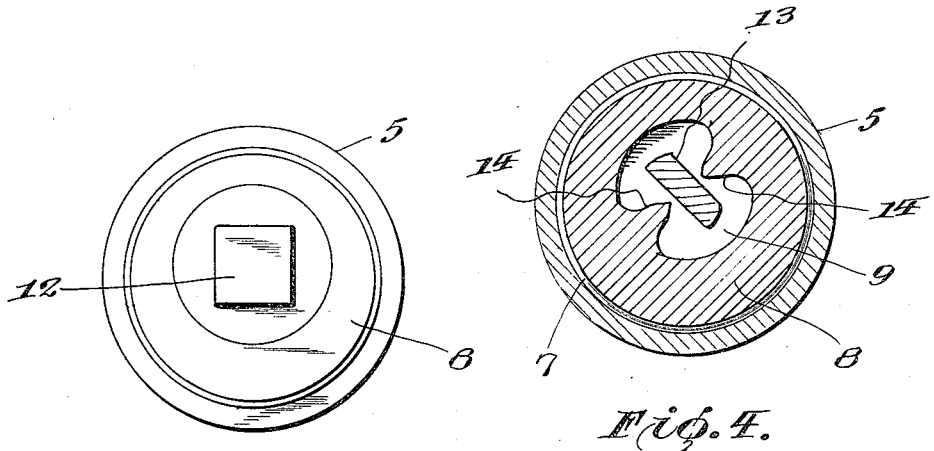
Inventor.
Samuel P. Jones.
Attorneys.

UNITED STATES PATENT OFFICE.

SAMUEL P. JONES, OF COLUMBIA, SOUTH CAROLINA.

LUBRICATOR.

1,421,487.  Specification of Letters Patent.  Patented July 4, 1922.

Application filed April 29, 1921. Serial No. 465,417.

*To all whom it may concern:*

Be it known that I, SAMUEL P. JONES, a citizen of the United States, residing at Columbia, in the county of Richland and State of South Carolina, have invented new and useful Improvements in Lubricators, of which the following is a specification.

This invention relates to that class of lubricators consisting of a cup from which the grease or other lubricant is forced by a screw-plug, and the object of the invention is to provide a novel and improved means for locking the plug in the cup so that it cannot turn in a direction to back out of the same and get lost.

The invention also has for its object to provide a locking device which enables the plug to be readily removed from the cup when it is necessary to replenish the supply of grease, without injury to the locking device.

The objects stated are attained by means of a combination and arrangement of parts to be hereinafter described and claimed, and in order that the same may be better understood, reference is had to the accompanying drawing forming a part of this specification.

In the drawing,

Figure 1 is a plan view of the device;

Fig. 2 is a vertical section on the line 2—2 of Fig. 3;

Fig. 3 is a horizontal section on the line 3—3 of Fig. 2, and

Fig. 4 is a horizontal section on the line 4—4 of Fig. 2.

Referring specifically to the drawing, 5 denotes a grease cup having a threaded outlet nipple 6 at the bottom for attachment to the part to be lubricated. The cup is threaded interiorly as usual, as shown at 7, to receive a screw plug 8 whereby the grease is adapted to be forced from the cup through the outlet nipple. Thus far described, the device is one of ordinary design, and nothing is claimed with respect thereto.

In order to prevent the screw plug 8 from accidentally backing out of the cup 5 and getting lost, a locking device is provided, which will now be described.

The plug 8 has a recess 9 running in the direction of its length from the outer end thereof, and terminating short of its inner end, so as to leave the latter solid. The plug 8 also has a side slot 10 opening into the recess 9.

In the recess 9 is mounted a stem 11 having its outer end projecting from the corresponding end of the plug, and being here formed with square or other head 12 for application of a wrench or similar tool. The inner end of the stem 11 is reduced and has an axially projecting wing 13 which is located to work between two diametrically opposite stop lugs 14 in the inner end of the recess 9. The stem 11 has a limited rotary movement in the recess 9, the range of such movement being limited by the lugs 14.

Various means may be provided for preventing the stem 11 from being pulled out of the recess 9. The drawing shows the stem provided with an encircling groove to seat a split resilient ring 15 which extends over into a registering groove in the wall of the recess.

The recess 9 and the stem 11 are located off the center of the plug 8, and to the inner end of the stem is connected so as to be swung when said stem is rotated, a laterally projecting locking finger 16 which projects through the slot 10 and is of such length as to come at its outer end in contact with the threads 7 of the cup 5, the outer end of the finger being reduced to a sharp edge so that it may enter between two adjacent threads and be wedged therebetween. When the finger 16 is in position to engage the threads 7 as stated, it is located at one end of the slot 10, and upon rotating the stem 11 to swing the finger in the direction of the other end of the slot, the finger is at the same time retracted to leave the threads 7, this action being due to the eccentric location of the stem 11 relative to the plug 8.

The inner end of the locking finger 16 is formed with a spring tongue 17 which is curved to extend partly around the reduced inner end of the stem 11 back of the wing 13. The free end of the tongue 17 bears against the end of the slot 10 opposite the end at which the finger 16 is located when in advanced or locking position, in view of which it will be evident that the spring tongue tends to swing the finger in the direction of the last-mentioned end of the slot.

The operative connection between the stem 11 and the finger 16 is made by providing the former with a lug 18 which seats behind the finger where it is joined to the tongue 17.

In operation, the cup 5 being filled with grease, the latter is compressed by screwing in the plug 8. To force the grease from the cup, the plug is given a turn as usual. The finger 16 does not lock the plug against turning in a direction to screw into the cup, as it backs away from the threads 7 when the plug is turned in this direction. However, any tendency of the plug to turn in a direction to back out of the cup is at once checked by the locking finger, for the reason that the rotation of the plug in this direction tends to jam the outer end of the finger still tighter between the threads 7, and hence the plug is automatically locked against turning in a direction to back out of the cup.

To remove the plug 8 from the cup 5, it is necessary only to apply a wrench or other suitable gripping tool to the head 12 of the stem 11 and turn the latter in the direction it would be necessary that the plug should be turned to screw out of the cup. The stem 11 first turns in the recess 9 and causes the finger 16 to be retracted and leave the threads 7, thereby unlocking the plug. When this action has taken place, the wing 13 so bears against the lugs 14 that the stem and the plug are now locked together, and upon continuing to apply force to the stem in a direction to unscrew the plug, the latter starts to turn, and it is in this manner screwed out of the cup.

Inasmuch as all the parts of the locking device, with the exception of the head 12 of the stem 11, are concealed, and the operation of unlocking the plug is entirely automatic and effected by an operation similar to that of unscrewing a plug by means of a wrench or similar gripping tool, the device is not liable to damage from any attempted improper manipulation, and it is fool-proof in every way.

I claim:

1. The combination of an interiorly threaded grease cup, a plug screwed into the cup, a rotatable longitudinal stem carried by the plug off the center thereof, the plug having a recess in which the stem seats and a side slot opening into said recess, a laterally extending locking finger seating in said slot, coacting means on the finger and the stem for coupling the same together when the stem is rotated in one direction, the outer end of the finger being shaped to jam the threads of the cup, and the rotation of the stem when coupled to the finger swinging the latter to clear the threads of the cup, and means for thereafter locking the stem against further rotation relative to the plug.

2. The combination of an interiorly threaded grease cup, a plug screwed into the cup, a rotatable longitudinal stem carried by the plug off the center thereof, the plug having a recess in which the stem seats and a side slot opening into said recess, a laterally extending locking finger seating in said slot, coacting means on the finger and the stem for coupling the same together when the stem is rotated in one direction, the outer end of the finger being shaped to jam the threads of the cup, and the rotation of the stem when coupled to the finger swinging the latter to clear the threads of the cup, means for thereafter locking the stem against further rotation relative to the plug, and resilient means tending to swing the finger in a direction to jam the threads of the cup.

3. The combination of an interiorly threaded grease cup, a plug screwed into the cup, a rotatable longitudinal stem carried by the plug off the center thereof, the plug having a recess in which the stem seats and a side slot opening into said recess, a laterally extending locking finger seating in said slot, coacting means on the finger and the stem for coupling the same together when the stem is rotated in one direction, the outer end of the finger being shaped to jam the threads of the cup, and the rotation of the stem when coupled to the finger swinging the latter to clear the threads of the cup, means for thereafter locking the stem against further rotation relative to the plug, and a resilient shank extending from the rear end of the finger, said shank being bowed around the stem and having its free end seating against one end of the aforesaid slot, and tending to hold the finger at the other end of the slot.

4. The combination of an interiorly threaded grease cup, a plug screwed into the cup, a rotatable longitudinal stem carried by the plug off the center thereof, the plug having a recess in which the stem seats and a side slot opening into said recess, a laterally extending locking finger seating in said slot, coacting means on the finger and the stem for coupling the same together when the stem is rotated in one direction, the outer end of the finger being shaped to jam the threads of the cup, and the rotation of the stem when coupled to the finger swinging the latter to clear the threads of the cup, means for thereafter locking the stem against further rotation relative to the plug, and a resilient shank extending from the rear end of the finger, said shank being bowed around the stem and having its free end seating against one end of the aforesaid slot, and tending to hold the finger at the other end of the slot, the stem having a lug which engages the finger adjacent to the shank to provide the aforementioned means for coupling the stem and the finger together.

5. The combination of an interiorly threaded grease cup, a plug screwed thereinto, a rotatable longitudinal stem carried by the plug off the center thereof, a laterally extending finger shaped at its outer end to jam the cup threads, coacting means on the stem and the finger for coupling the same together when the stem is rotated in one direction, such rotation of the stem swinging the finger clear of the cup threads, and means for thereafter locking the stem against further rotation relative to the plug.

6. The combination of an interiorly threaded grease cup, a plug screwed thereinto, means carried by the plug for locking the same in the cup against turning in a direction to unscrew, and means carried by the plug for disengaging the locking means, said disengaging means being also operable to turn the plug in a direction to screw out of the cup.

7. The combination of a grease cup, and a closure applicable thereto and adjustable thereon for forcing the lubricant from the same, the connection between said cup and its closure being a threaded one, a means for locking the closure to the cup to positively prevent turning of said closure in a direction to unscrew, and means carried by the plug for disengaging the locking means, said disengaging means being also operable to turn the closure in a direction to unscrew from the cup.

In testimony whereof I affix my signature.

SAMUEL P. JONES.